United States Patent [19]
Allen

[11] Patent Number: 6,009,224
[45] Date of Patent: Dec. 28, 1999

[54] FIBER OPTIC ORGANIZER WITH LOCKABLE TRAYS AND METHOD OF ACCESSING A TRAY

[76] Inventor: Barry Wayne Allen, 408 Bonlee Bennett Rd., Siler City, N.C. 27344

[21] Appl. No.: 08/965,259

[22] Filed: Nov. 6, 1997

[51] Int. Cl.$^6$ ....................................................... G02B 6/00
[52] U.S. Cl. ............................................................. 385/135
[58] Field of Search ..................................... 385/134–137

[56] References Cited

U.S. PATENT DOCUMENTS

| | | | |
|---|---|---|---|
| 5,323,480 | 6/1994 | Mullaney et al. | 385/135 |
| 5,363,466 | 11/1994 | Milanowski et al. | 385/135 |
| 5,440,665 | 8/1995 | Ray et al. | 385/135 |
| 5,491,766 | 2/1996 | Huynh et al. | 385/100 |
| 5,553,186 | 9/1996 | Allen | 385/135 |
| 5,754,723 | 5/1998 | Fremgen | 385/135 |
| 5,835,657 | 11/1998 | Suarez et al. | 385/135 |

OTHER PUBLICATIONS

Raychem Corporation Product Brochure FOSC 400, "*Fiber Optic Splice Closures*," pp. 1–4, Dec. 1996.
Raychem Corporation Product Brochure FOSC 200D, "*Fiber Optic Splice Closure*," pp. 1–2, Sep. 1993.
Raychem Corporation Product Brochure, "*Fibre Infrastructure System Technology,*" pp. 1–4, Feb. 1995.

*Primary Examiner*—Hemang Sanghavi
*Attorney, Agent, or Firm*—Herbert G. Burkard

[57] ABSTRACT

A fiber optic organizer includes a mounting bracket and a plurality of organizer trays having proximal and distal ends. The organizer trays are pivotally connected at their proximal ends to the mounting bracket and are movable between a stacked position and a raised position to facilitate access to an underlying organizer tray. A locking mechanism is positioned on the distal end of each tray and locks at least two adjacent organizer trays together in a raised position when the organizer trays are lifted to a predetermined angle, and disengages the locked organizer trays when the organizer trays are lifted beyond the predetermined angle. The locking mechanism on each organizer tray includes a slot and an upstanding tab that is received within a slot on an overlying organizer tray when the organizer trays are raised to a predetermined angle. The tab and slot can be angled to assist in pushing an overlying organizer tray into its raised position and also assist in retaining the organizer trays in a locked position if the locked organizer trays are jarred. When raised beyond the predetermined angle, the organizer trays can separate from each other. As the organizer trays are lowered into the stacked position, the organizer trays are maintained separate from each other.

46 Claims, 8 Drawing Sheets

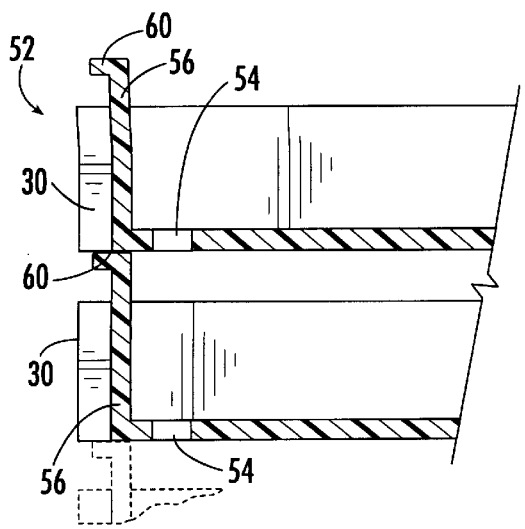
FIG. 5A.
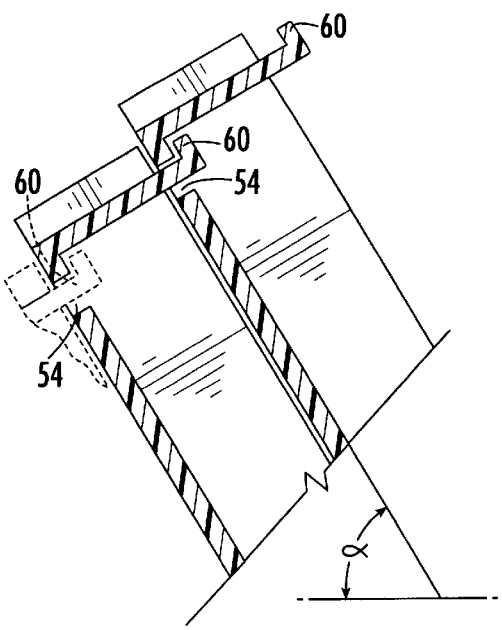
FIG. 6.
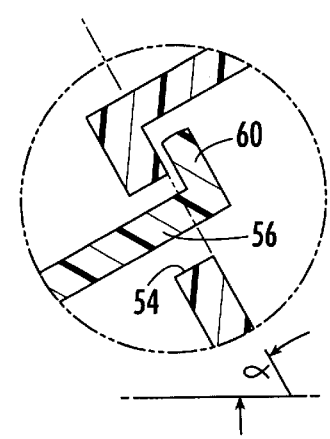
FIG. 7A.
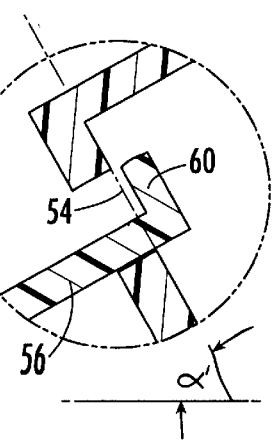
FIG. 8.
FIG. 9.

FIBER OPTIC ORGANIZER WITH LOCKABLE TRAYS AND METHOD OF ACCESSING A TRAY

FIELD OF THE INVENTION

The present invention relates to the field of fiber optics, and, more particularly, to a fiber optic organizer with a plurality of organizer trays.

BACKGROUND OF THE INVENTION

Optical fiber communications systems typically use fiber optic cables and associated digital electronics to transmit large volumes of data and voice signals over relatively long unrepeated distances, while being virtually noise free. An optical fiber communications system typically includes optical connectors, and in some instances, fusion splices between individual fibers, such as to connect one cable to an adjacent cable, or to terminate the cable to be connected to associated electronics. These optical connectors can be at drop points for fiber optic cables as required in a large optical fiber communications system, for example. The optical connectors can be part of a building network, and mounted to an equipment rack where a plurality of accessible organizer trays each hold a number of optical connectors. When the optical connectors are to be changed or repaired, the requisite organizer trays are raised to an elevated position and locked to expose the underlying organizer tray having the particular optical connector to be changed or repaired.

An example of a closure used in such communications systems is a model FOSC 100, manufactured by the assignee of the present invention, which typically includes one or more fiber optic organizers having organizer trays disposed in stacked arrangement within a protective housing. Another example is disclosed in U.S. Pat. No. 5,323,480 assigned to the present assignee, the disclosure which is hereby incorporated by reference in its entirety. As disclosed in the '480 patent, the organizer trays are pivotally connected at one end to a mounting bracket, which is typically connected to the inside face of a closure end cap. This pivotal connection permits individual organizer trays to be temporarily moved to a raised position while allowing access to an underlying organizer tray to check fiber routing, reposition an optical connector or perform other maintenance. The organizer trays are held in a raised position on a relatively complicated series of cammed surfaces having detents that work in conjunction with a detent bar. A hinged pin mounting bracket carries the detent bar in spaced relation from a hinge pin. This type of locking mechanism may add to the overall end cost of each fiber optic organizer.

In other prior art devices, the organizer trays have been held in a raised position by a separate kick stand arrangement, which holds one or more trays in an elevated position, or by detents formed on the hinge of the tray. In some instances, organizer trays have been held in position by using any available prop, such as a roll of electrical tape. The kick stand support is not an integral part of the tray and can be misplaced. It is also relatively expensive and takes up valuable organizer tray space, and may decrease the density of optical connectors that can be placed on an organizer tray. Detents are not always reliable because they often are not formed as an integral part of the tray, and may sometimes break. Any other field improvised support, such as a roll of electrical tape, may be inefficient and impractical.

It would be advantageous if a support mechanism for holding organizer trays could be inexpensively formed, and remain simple in design compared to a separate kick stand or detents. An improved support for locking elevated organizers trays may also increase the optical connector capacity of a tray and increase the density of optical connectors without increasing the physical area of the tray.

SUMMARY OF THE INVENTION

In view of the foregoing background, it is therefore an object of the present invention to provide a fiber optic organizer where the organizer trays can be locked in a raised position to facilitate access to an underlying tray, without a separate kick stand support or detents.

It is another object of the present invention to increase the capacity of an organizer tray used in a fiber optic organizer and increase the density of optical connectors that can be placed on an organizer tray, while having a simplified locking mechanism for holding organizer trays in a raised position.

The present invention overcomes many of the aforementioned problems and includes a fiber optic organizer having a mounting bracket and a plurality of organizer trays. Each tray has proximal ends pivotally connected to the mounting bracket. The trays are movable between a stacked position, and a raised position to facilitate access to an underlying organizer tray. A locking mechanism is positioned on the distal end of each tray and locks at least two trays together in the raised position to facilitate access to an underlying tray. In a preferred embodiment, the locking mechanism locks two trays together in the raised position when the trays are lifted to a predetermined angle. The locking mechanism also disengages the trays from the locked position when the organizer trays are lifted beyond that predetermined angle.

In one aspect of the present invention, the locking mechanism includes an upstanding tab, which is received within a slot on an overlying tray when the trays are raised. Each upstanding tab can include an end having a protrusion for engaging the tray when the tab is received within the slot. The tab can also engage a slot in the overlying tray when the trays are raised to a predetermined angle and disengage when the trays are raised beyond a predetermined angle.

In still another aspect of the present invention, the distal ends of the organizer trays are offset so that when an organizer tray is raised to a predetermined angle, the tab in an underlying organizer tray is received within a slot on the overlying organizer tray. The bracket can be angled so that organizer trays are offset to each other.

In still another aspect of the present invention, the organizer trays can be rectangular configured and/or oval configured. The fiber optic organizer can include a housing for supporting the bracket and organizer trays. The housing can form a chamber and can have a rectangular shape for assembly into a rack system. An organizer tray also can include tabs to retain a fiber optic cable or other optical cable to the tray, and strain relief grommets to aid in preventing breakage of optical fiber cables.

BRIEF DESCRIPTION OF THE DRAWINGS

Other objects, features and advantages of the present invention will become apparent from the detailed description of the invention which follows, when considered in light of the accompanying drawings in which:

FIG. 5A is an enlarged sectional view showing the distal end of two organizer trays when in the stacked position and showing the offset mounting of the organizer trays to other;

FIG. 6 is another sectional view showing two organizer trays raised to the predetermined angle ( ) and showing a protrusion formed as a ledge on the end of the tab and received into the slot on the overlying organizer tray;

FIG. 7A is a greatly enlarged sectional view showing the tab and protrusion received into the slot of an overlying organizer tray;

FIG. 8 is another greatly enlarged sectional view showing how the tab moves into the slot as the organizer trays are lifted beyond the predetermined angle ( );

FIG. 9 is yet another greatly enlarged sectional view showing how the tab is withdrawn from the slot as the organizer trays are lifted to an even greater angle beyond the predetermined angle ( );

DETAILED DESCRIPTION OF THE PREFERRED EMBODIMENTS

Figure 1:
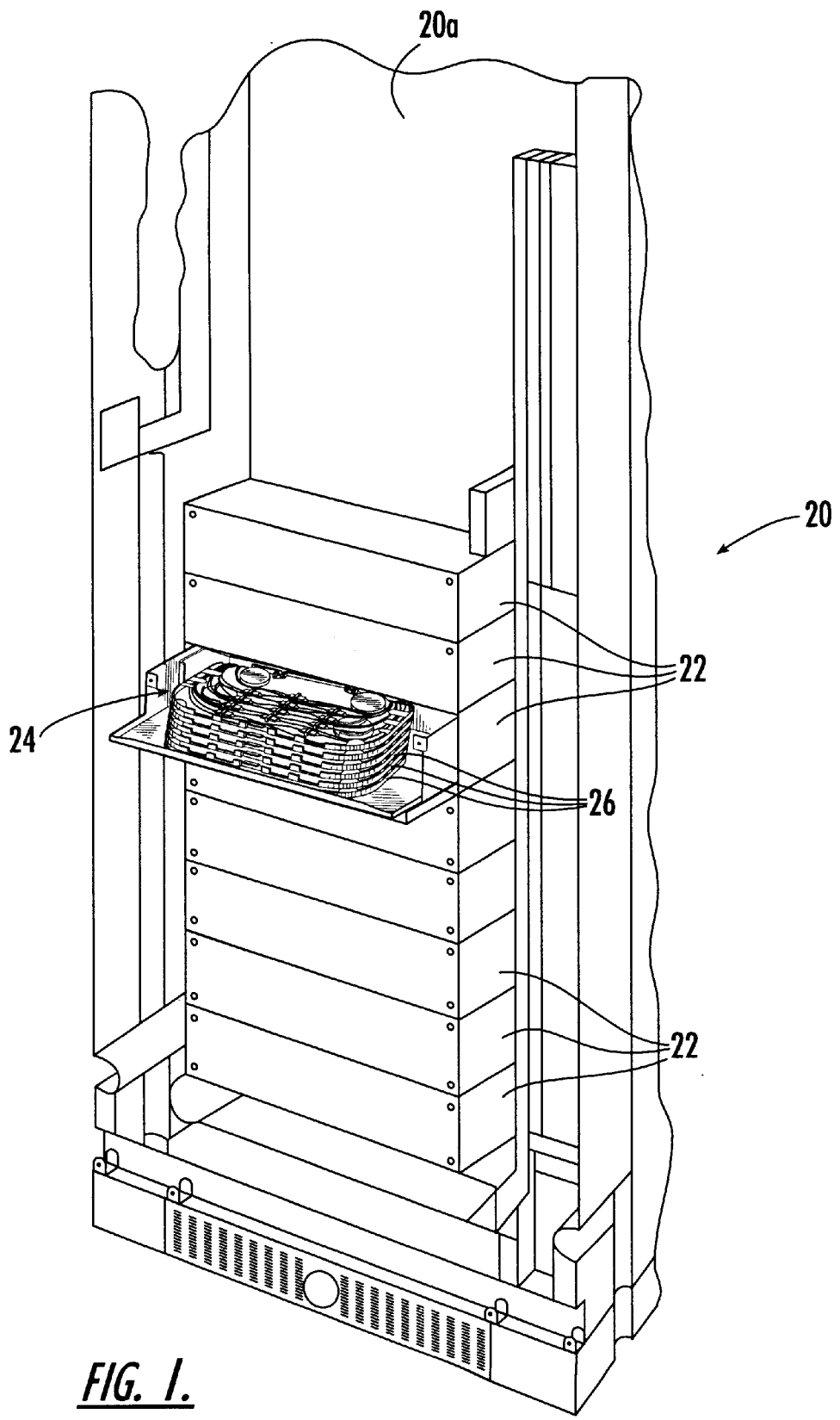
FIG. 1 is perspective view of an equipment rack fiber optic/organizer in accordance with the present invention.

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

The present invention relates to an optical fiber management system having at least one fiber optic organizer to organize and protect optical fibers and optical connectors for an optical fiber communications systems, such as the Fibre Infrastructure System Technology sold under the acronym and Trademark FIST by the assignee of the present invention, Raychem Corporation. FIG. 1 illustrates an equipment rack unit 20 such as used in a local area network at a customer business premises. Although the invention will be described with particular reference to the illustrated equipment rack unit 20, it should be understood that the invention can be used with any fiber optic organizer, such as optical connector closures adapted to be buried in the ground, aerial applications, and other optical connector, patch and cable constructions known to those skills in the art.

The equipment rack unit 20 receives a large number of optical fibers from a network exchange for delivery into a customer business premises. In FIG. 1, the front side of the rack unit is shown, with the front side of rear panel 20a shown. The equipment rack unit 20 includes a plurality of rectangular configured organizer housings 22 disposed in vertical orientation like shelves on the rear side rack unit 20. The organizer housings can be injection molded or formed from sheet metal or any other similar rigid and strong material. Each rectangular configured organizer housing 22 supports a fiber optic organizer, indicated generally at 24, having a plurality of organizer trays 26, positioned in the organizer housing 22 in accordance with the present invention. Each organizer housing can be accessed through the front of the equipment rack unit 20 to allow access to the fiber optic organizers and their respective organizer trays. Each housing forms part of a "shelf" arrangement in the equipment rack unit 20.

Figure 2:
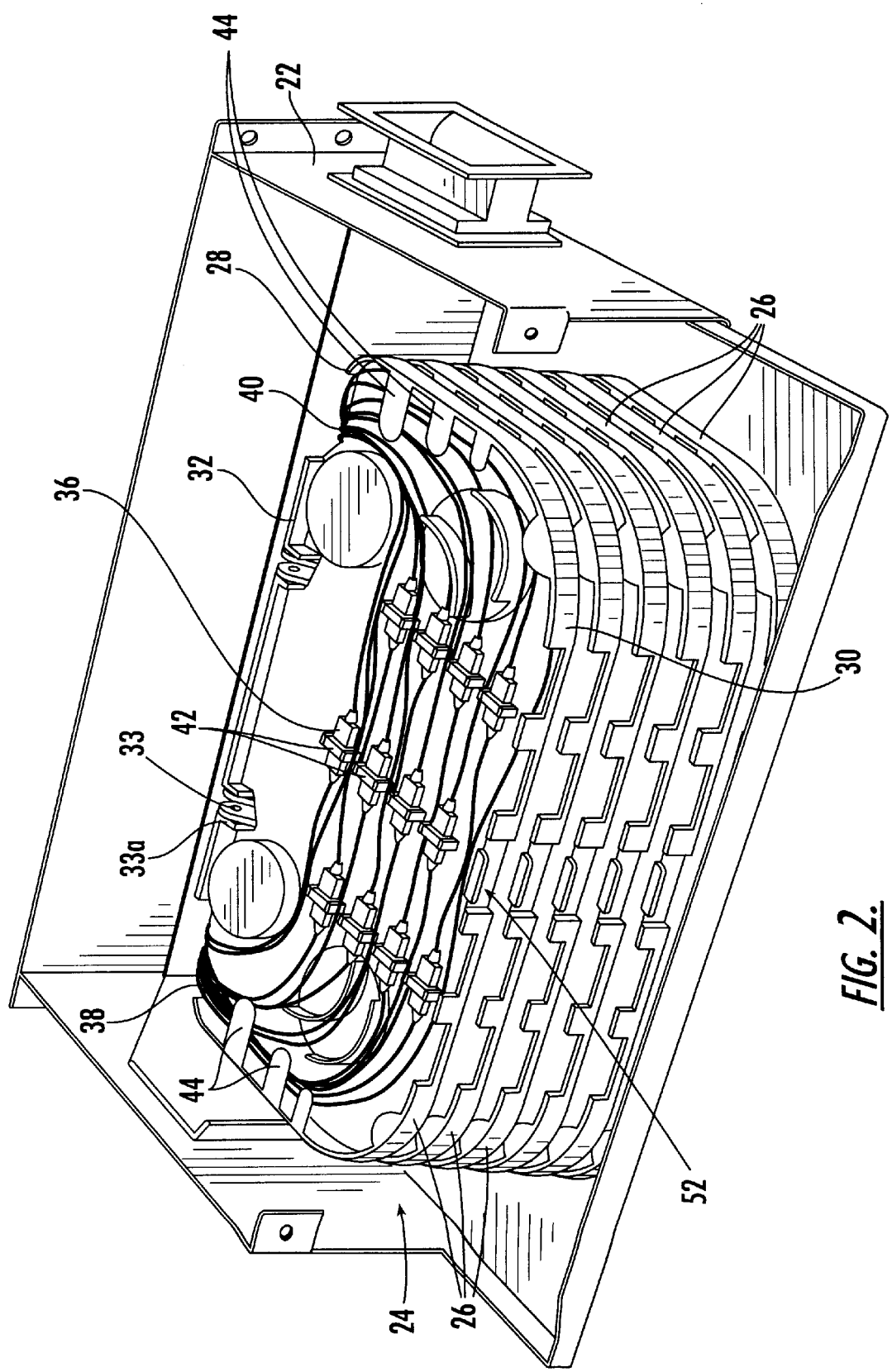
FIG. 2 a perspective view of fiber optic organizer of the present invention showing the organizer trays in a stacked position.
Figure 3:
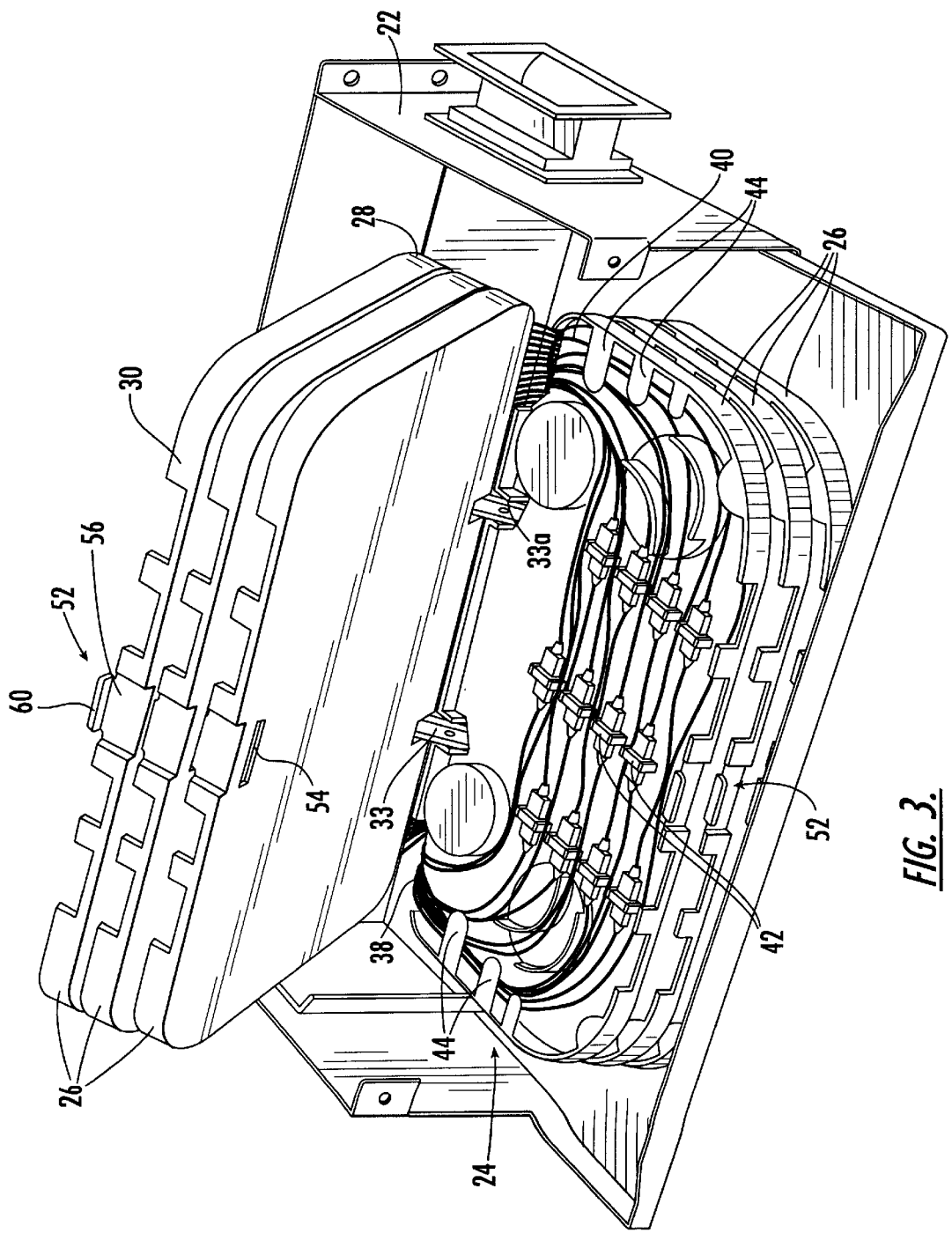
FIG. 3 is a perspective view of the fiber optic organizer as in FIG. 2 and showing three organizer trays raised to a predetermined angle ( ) and locked in that position to expose an underlying organizer tray.
Figure 4:
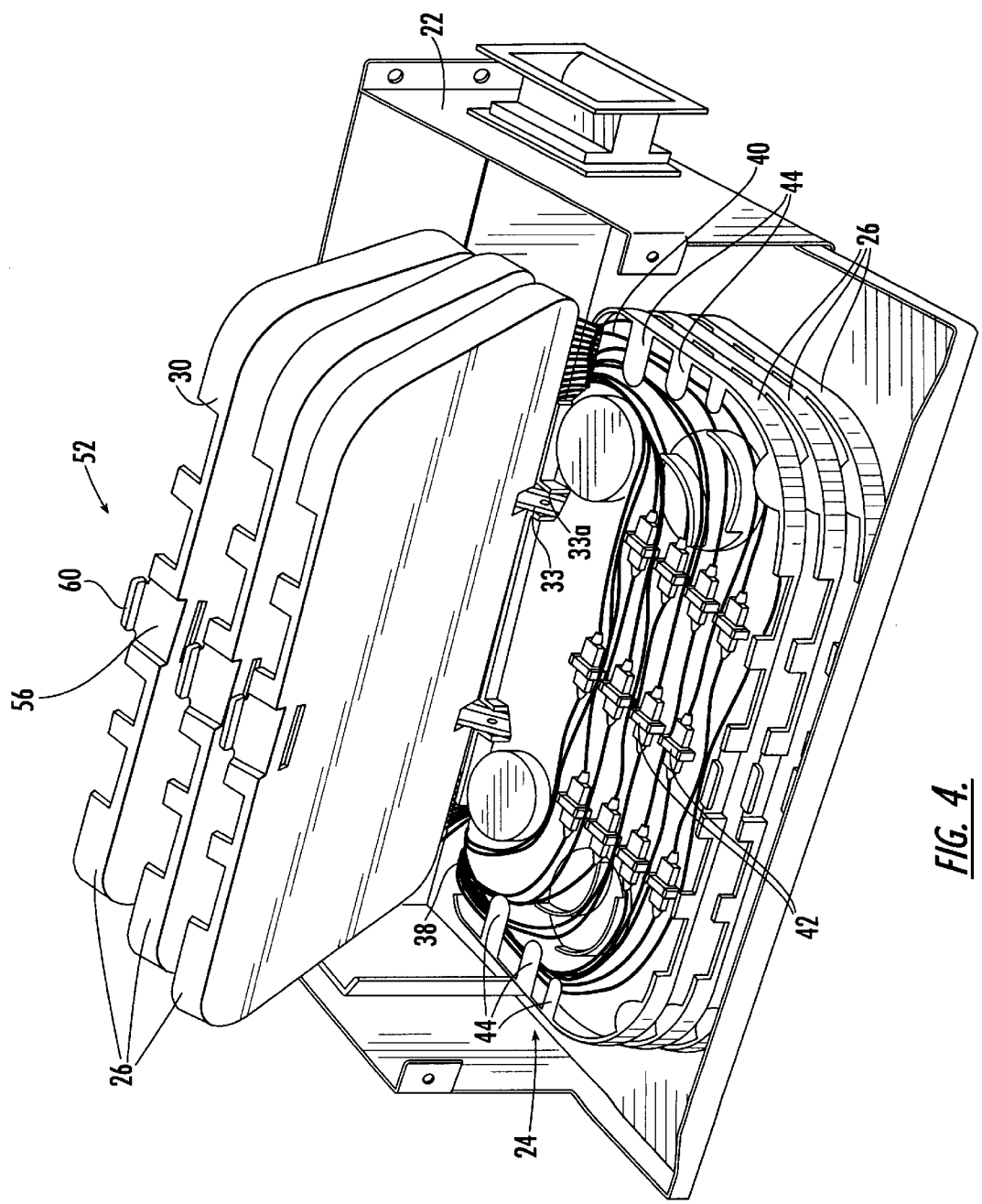
FIG. 4 is a perspective view of the fiber optic organizer as in FIG. 3 showing the same three organizer trays raised beyond the predetermined angle ( )and separated from each other to disengage the organizer trays from their locked position.

FIGS. 2–4 illustrate one type of an enlarged rectangular configured organizer housing 22 for the fiber optic organizer 24 where six organizer trays 26 are disposed in stacked relationship to each other. The organizer trays 26 of the present invention are formed from molded plastic or other similar material known to those skilled in the art. Each organizer tray 26 includes respective proximal and distal ends 28,30 and are pivotally connected at their proximal ends 28 to a mounting bracket 32, which is secured in the respective organizer housing 22. Two mounting rods 33 extend through flanged support mounts 33a positioned on the mounting bracket 32 and pivotally mount the organizer trays 26 for pivotal movement from the stacked to the elevated or raised position. The organizer trays 26 are movable between the stacked position shown in FIG. 2, and a raised position shown in FIG. 3 to facilitate access to optical fiber cables and connectors positioned in an underlying organizer tray.

Each organizer tray organizes and protects the optical fiber optical connectors 36 used for splicing or patching a first set of optical fibers 38, such as originating from a network, into a second set 40 having a destination in the premises. Each organizer tray 26 includes a plurality of receptacles 42 used to position the optical fiber optical connectors 36 in the central section of an organizer tray. The organizer tray is shown as having an offset three by four matrix arrangement of the receptacles 42, which allows optical fibers 38, 40 to pass in between the connectors 36 and the other rows. Holding tabs 44 are positioned along the right and left walls of the organizer tray and retain the optical fiber cables 38,40 to the organizer tray 26. The organizer trays could also include strain relief grommets 50 (FIG. 11) that could be positioned near the entry point 51 of the optical fiber cables onto the organizer tray (FIG. 12).

Figure 11:
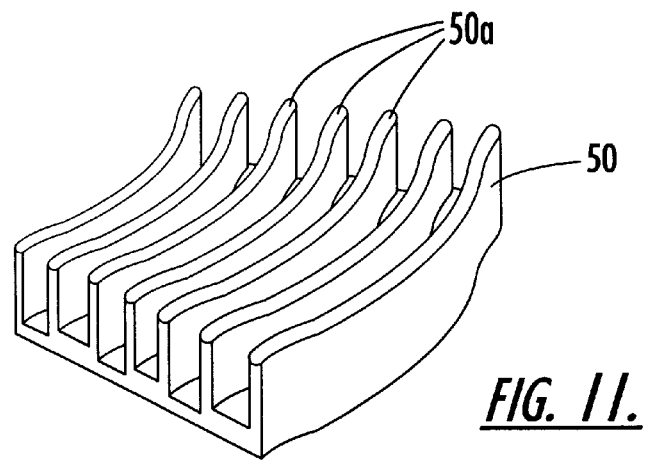
FIG. 11 is an enlarged perspective view of a strain relief grommet that can be used with an organizer tray of the present invention.
Figure 12:
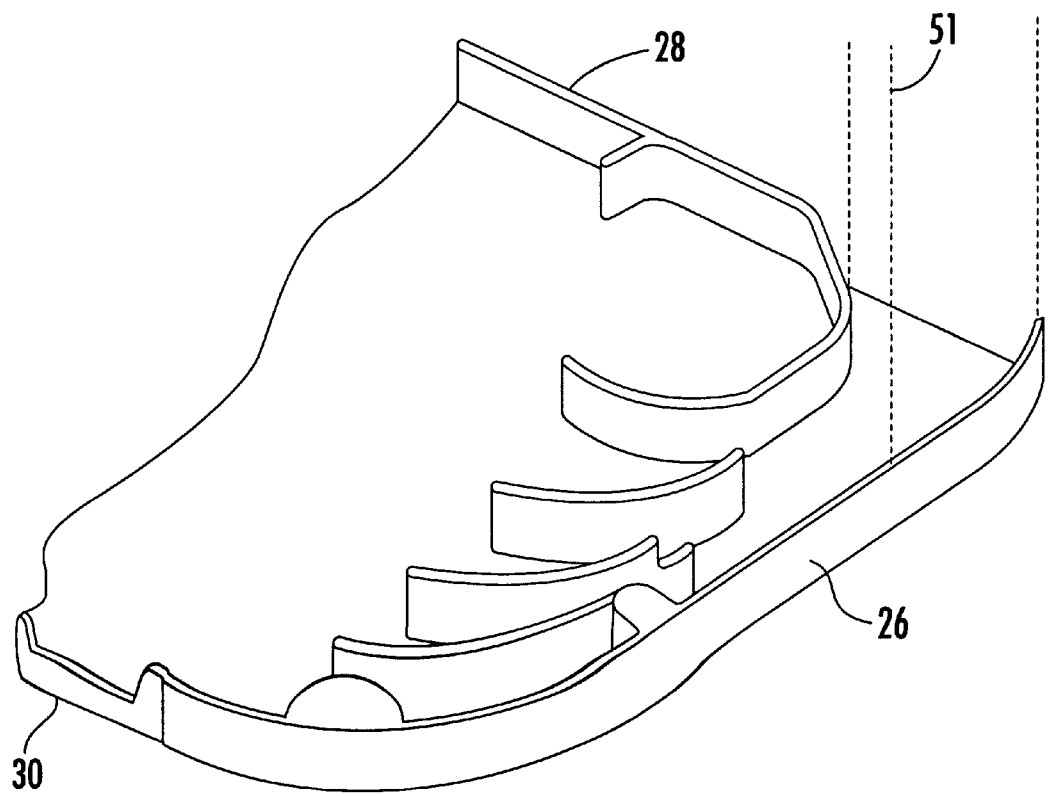
FIG. 12 is a perspective view of part of an organizer tray in accordance with the present invention, which is formed to receive a strain relief grommet of FIG. 11.

When a strain relief grommet 50 as depicted in FIG. 11 is used, the illustrated opposed bow geometry 50a provides equal pressure to both sides of the optical fiber cable, thus preventing any "S" bending of the optical fiber cable. This strain relief grommet 50 also can achieve high density packing of optical fiber cables by stacking the optical fiber cables two-high.

Figure 5B:
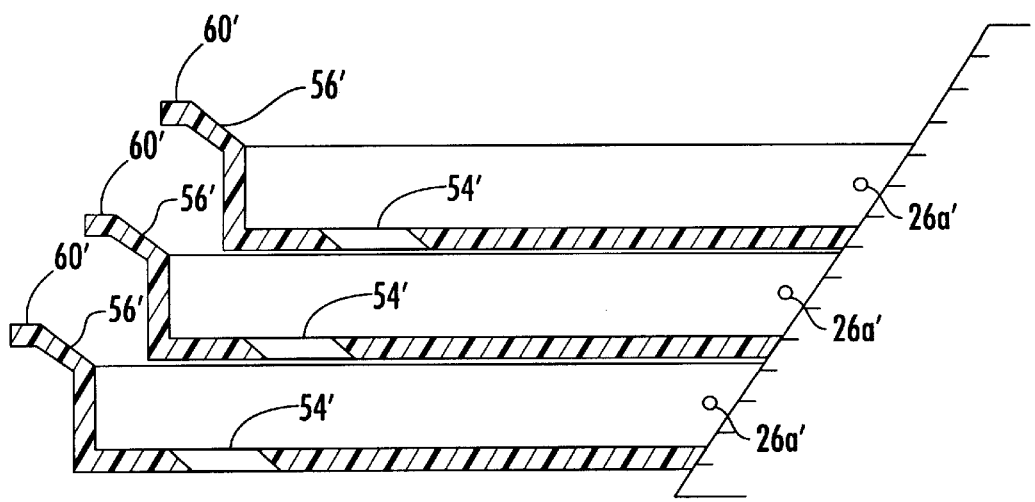
FIG. 5B is another enlarged sectional view similar to FIG. 5A, but showing the organizer trays positioned offset to each other, and an angled tab and slot.
Figure 7B:
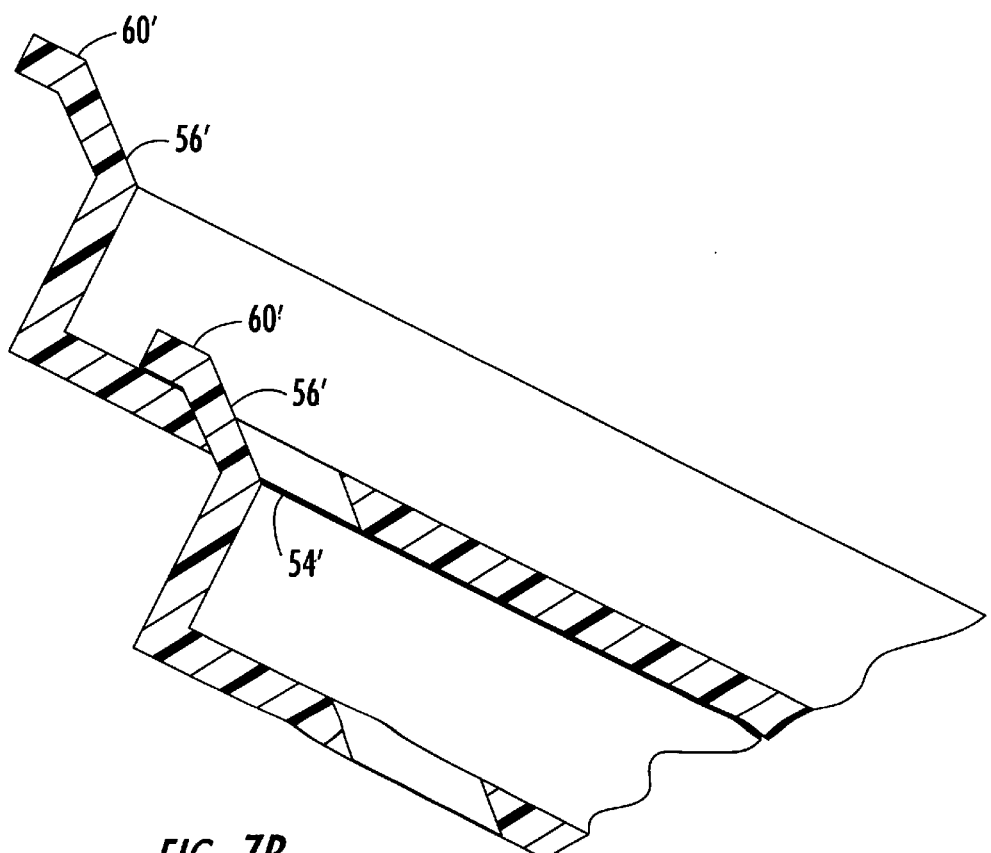
FIG. 7B is another greatly enlarged sectional view similar to FIG. 7A, showing the angled tab and slot.

As shown in FIG. 5A, the organizer trays 26 are pivotally connected to the mounting bracket 34 so that they are stacked substantially in the same horizontal orientation. FIGS. 5B and 7B illustrate a preferred embodiment where the organizer trays are stacked in an offset relation to each other. Like reference numerals refer to common elements, but with prime notation in FIGS. 5B and 7B. Because each of the organizer trays are about the same size, the proximal ends 28' of the organizer trays 26' are pivotally connected to the mounting bracket 32' in offset relation to each other so that successive underlying organizer trays in the stack have distal ends 30' positioned a greater offset distance from the mounting bracket 32'. The mounting bracket can be slightly inclined to allow the offset among the organizer trays.

As shown in FIGS. 5–9, the distal end 30 of each organizer tray 26 includes locking means, indicated generally at 52, for locking at least two organizer trays 26 together in the raised position to facilitate access to an underlying tray (FIG. 3). In a preferred embodiment, the organizer trays 26 are locked together in the raised position when the trays are raised to a predetermined angle ( ). The locking means 52 is disengaged from another organizer tray to allow organizer trays to move back into the prone, stacked position when the trays are raised beyond a predetermined angle ( ) as shown in FIGS. 4 and 6–9. In one embodiment of the present invention, the predetermined angle is about 60 degrees, which allows enough space between the elevated organizer trays and the stacked trays so that one may reach into the defined space for access to the optical fibers. Maintenance on the fibers is facilitated when the organizer trays are locked together, thus gaining access to an underlying tray. A much smaller predetermined angle could lock together the trays together, but the smaller angle may not facilitate access to an underlying tray.

As shown in FIG. 5A, the locking means 52 on each organizer tray 26 comprises a slot 54 formed on the central portion of an organizer tray at its distal end 30 and an upstanding tab 56 formed as part of the front wall of the overlying tray, which is configured to be received within the slot 54 in an overlying tray when the trays are raised to the predetermined angle ( ). The upstanding tab 56 includes an end having a protrusion 60 formed as a ninety (90) degree ledge that engages the slot 54 on the overlying tray when the tab is received within the slot on the overlying tray. Although a ninety degree ledge is illustrated, the protrusion 60 can be formed in any manner that allows locking engagement with the slot of an overlying organizer tray. The tab 56 and slot 54 are typically formed integral with the organizer tray, such as during initial manufacturing. The amount (or distance) the distal ends are offset is a function of the predetermined angle ( ) at which the upstanding tab 56 is to be received in the slot 54 of the overlying tray 26. In the present invention, the tab 56 of an underlying organizer tray is received within the slot of the overlying organizer tray when the trays are raised to the predetermined angle ( ), for example, about a sixty (60) degree angle.

In the embodiment shown in FIG. 5B, the organizer trays 32' are formed with an angled tab 56' and angled slot 54'. The organizer trays 26' also are pivotally connected along a pivot pin 26A' to the mounting bracket 34' so that the distal ends of the organizer trays 34' are offset to each other. As the organizer trays are raised into the predetermined angle, the angled tab 56' engages the bottom portion of an overlying organizer tray 26' to help push that organizer tray into the raised position. Once the organizer trays are raised into position at the predetermined angle (FIG. 7B), the tab 56' moves into the angled slot 54' and the protrusion 60' engages the slot 54'.

When the locked and elevated organizer trays are raised beyond the predetermined angle (in this case about 60 degrees), the protrusion formed as the ninety (90) degree ledge 58 then moves toward the slot 54 (FIG. 7A) and upon further elevation of the organizer trays, the tab 56 and its associated ledge 60 begin to move into the slot 54 and then pass through the slot 54 as shown in FIGS. 8 and 9. The organizer trays 26 separate from each other when the raised organizer trays 26 are raised beyond the predetermined angle. At this time, one's fingers can be used to separate the various organizer trays 26 from each other, such as shown in FIG. 4, where the organizer trays are illustrated in a "fanned" arrangement. Each organizer tray 26 then can be lowered onto the respective underlying tray in a gentle manner to prevent breakage of any optical fibers and optical connectors positioned on respective organizer trays.

In the embodiment shown in FIGS. 5B and 7B, the angled tab 56' and slot 54' are configured so that if the organizer trays are accidentally bumped or jarred beyond the predetermined angle, the angled tab 56' engages against the angled slot 54' and causes the organizer trays to move back into the locked position. This is advantageous because workers often jar or bump the organizer trays when the organizer trays are in the locked position. Even though the organizer trays separate slightly when raised into a position beyond the predetermined angle, the organizer trays still will fall back into the locked position. The slotted configuration also helps to force apart organizer trays when they are raised beyond the predetermined angle.

In the embodiment shown in FIGS. 5B and 7B, the organizer trays can be unlocked from each other by moving the organizer trays 26' beyond the predetermined angle ( ) and then manually separating the organizer trays. The organizer trays 26' are then lowered into the stacked position.

Figure 10:
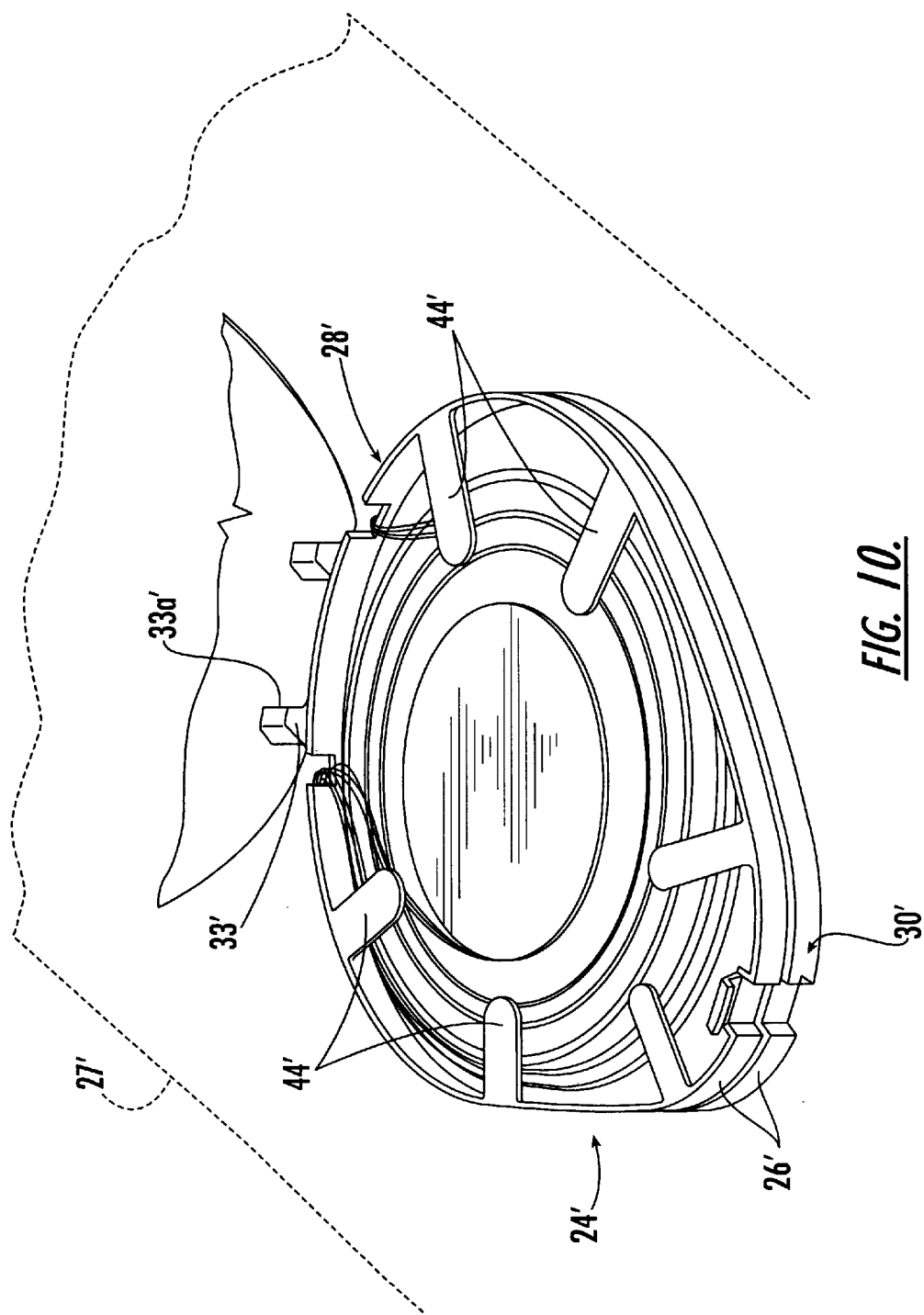
FIG. 10 is a perspective view of an organizer tray in a generally oval configuration.

The organizer tray can also be formed as different configurations besides the substantially rectangular configurations shown in FIGS. 1–4. FIG. 10 illustrates another configuration where the organizer tray 26' is generally oval in configuration. Like elements for this oval embodiment are given prime notation. The same locking means is positioned on the distal end and the similar hinge mechanism using mounting rods 33', which extend through flanged support mounts 33a' position on the mounting bracket 32'. Naturally, the illustrated oval and rectangular configurated organizer trays are only one configuration and other configurations are possible as suggested to those skilled in the art. The organizer tray 26' not only can be mounted in a rack as illustrated in FIG. 1, but also can be mounted in an enclosure such as sealed chamber, indicated by dotted lines 27', and used in underwater and similar applications.

The present invention is advantageous because it uses a locking mechanism positioned on the distal end of the organizer trays, which can be integrally formed. The upstanding tab and appropriately formed slot are advantageous over prior art devices having a separate kick stand or detents. The structural simplicity of the present invention achieves a cost reduction and eliminates the large kick stand that naturally requires valuable space on the organizer. The locking mechanism is an integral part of the organizer tray and eliminates the possibility of misplacement or loss, such as with a separate kick stand support. The tab and slot are self-engaging and cannot be accidently bumped or disengaged while manipulating the optical fiber cables. Also, the prior art detents, such as used on hinges or other locations, are no longer necessary when the more stable physical structure of the tab and slot as in the present invention is used. Because a complicated detent mechanism and separate kick stand are no longer required, the capacity of the organizer tray may be increased from a typical eight to twelve optical connectors or connectors per tray, and, as an example, from 48 to 72 connectors per organizer shelf. Thus, the density of optical connectors can be increased without increasing the necessary space requirements.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed and that the modifications and embodiments are intended to be included within the scope of the appended claims.

That which is claimed is:

1. A fiber optic organizer comprising:
    a mounting bracket;
    a plurality of organizer trays, each organizer tray having proximal and distal ends and being pivotally connected at the proximal end to the mounting bracket to be movable between a stacked position and a raised position to facilitate access to an underlying organizer tray; and
    locking means positioned on the distal end of each organizer tray for locking at least two organizer trays together in the raised position to facilitate access to the underlying organizer tray and for disengaging the adjacent organizer trays when they are lifted beyond a predetermined angle.

2. The fiber optic organizer according to claim 1 wherein said locking means locks adjacent organizer trays together in the raised position when the adjacent organizer trays are lifted to a predetermined angle.

3. The fiber optic organizer according to claim 1 including means pivotally mounting the organizer trays offset to each other so that the organizer trays are separated from each other when the trays are raised beyond the predetermined angle.

4. The fiber optic organizer according to claim 1 wherein said locking means comprises a slot on an overlying organizer tray and an upstanding tab on an underlying organizer tray that is received within the slot when the organizer trays are raised.

5. The fiber optic organizer according to claim 4 wherein said tab and slot are angled.

6. The fiber optic organizer, according to claim 5, wherein said distal ends of the organizer trays are offset so that the angled tab on the underlying organizer tray engages an overlying organizer tray and aids in pushing the overlying organizer tray into its raised position.

7. The fiber optic organizer, according to claim 6, wherein said angled slot engages said angled tab on an underlying tab to assist in retaining the organizer trays in a locked position.

8. The fiber optic organizer according to claim 4 wherein each upstanding tab includes an end having a protrusion for engaging the overlying organizer tray when the tab is received within the slot.

9. The fiber optic organizer according to claim 4 wherein said tab engages the slot in the overlying tray when the organizer trays are raised to a predetermined angle.

10. The fiber optic organizer according to claim 4 wherein said tab disengages from the slot when the organizer trays are raised beyond a predetermined angle.

11. The fiber optic organizer according to claim 4 wherein the distal ends of said organizer trays are offset so that as an organizer tray is raised to a predetermined angle, the tab in an underlying organizer tray is received within the slot on the overlying organizer tray.

12. The fiber optic organizer according to claim 1 wherein said bracket is angled so that the organizer trays are offset to each other.

13. The fiber optic organizer according to claim 1 wherein said organizer trays are generally rectangular.

14. The fiber optic organizer according to claim 1 wherein said organizer trays are generally oval.

15. The fiber optic organizer according to claim 1 including a housing for supporting said mounting bracket and organizer trays.

16. The fiber optic-organizer according to claim 15 wherein said housing forms a sealed chamber.

17. The fiber optic organizer according to claim 15 wherein said housing is generally rectangular.

18. The fiber optic organizer according to claim 15 wherein said housing includes means for mounting to an equipment rack.

19. The fiber optic organizer according to claim 1 wherein each of said organizer trays includes guides to retain a fiber optic cable to the organizer tray.

20. The fiber optic organizer according to claim 1 wherein each of said organizer trays includes at least one strain relief grommet.

21. A fiber optic organizer comprising
    a mounting bracket;
    a plurality of organizer trays, each organizer tray having proximal and distal ends and pivotally connected at the proximal end to the mounting bracket to be movable between a stacked position and a raised position to facilitate access to an underlying organizer tray; and
    locking means positioned on the distal end of each organizer tray for locking at least two organizer trays together in the raised position when the organizer trays are lifted to a predetermined angle to facilitate access to the underlying organizer tray and for disengaging the organizer trays when the organizer trays are lifted beyond the predetermined angle.

22. The fiber optic organizer, according to claim 21, including means pivotally mounting the organizer trays offset to each other so that the raised organizer trays are separated from each other when the trays are raised beyond the predetermined angle.

23. The fiber optic organizer according to claim 21 wherein said locking means comprises a slot on an overlying organizer tray and an upstanding tab on an underlying organizer tray that is received within the slot when the organizer trays are raised.

24. The fiber optic organizer according to claim 23 wherein each upstanding tab includes an end having a protrusion for engaging the organizer tray when the tab is received within the slot.

25. The fiber optic organizer according to claim 23 wherein said tab engages the slot in the overlying organizer tray when the organizer trays are raised to a predetermined angle.

26. The fiber optic organizer according to claim 23 wherein said tab disengages from the slot when the organizer trays are raised beyond a predetermined angle.

27. The fiber optic organizer according to claim 23 wherein the distal ends of said organizer trays are offset so that an organizer tray is raised to a predetermined angle, the tab in an underlying organizer tray is received within the slot on the overlying organizer tray.

28. The fiber optic organizer according to claim 23 wherein said organizer trays are generally rectangular.

29. The fiber optic organizer according to claim 23 wherein said organizer trays are generally oval.

30. The fiber optic organizer according to claim 23 including a housing for supporting said mounting bracket and organizer trays.

31. The fiber optic organizer according to claim 30 wherein said housing forms a sealed chamber.

32. The fiber optic organizer according to claim 30 wherein said housing is generally rectangular.

33. The fiber optic organizer according to claim 30 wherein said housing includes means for mounting to an equipment rack.

34. The fiber optic organizer according to claim 23 wherein the predetermined angle at which two adjacent organizer trays are locked together is about 60 degrees.

35. The fiber optic organizer according to claim 23 wherein said organizer tray includes guides to retain a fiber optic cable to the organizer tray.

36. The fiber optic organizer according to claim 23 wherein each of said organizer trays includes at least one strain relief grommet.

37. A fiber optic organizer comprising:

a mounting bracket;

a plurality of organizer trays, each organizer tray having proximal and distal ends and pivotally connected at the proximal end to the mounting bracket to be movable between a stacked position and a raised position to facilitate access to an underlying organizer tray; and an angled slot and upstanding angled tab positioned on the distal end of each tray and configured so that when at least two adjacent organizer trays are raised to a predetermined angle, the angled tab on an underlying organizer tray initially engages the overlying tray to assist in pushing the organizer tray into the predetermined angle where the angled tab engages the angled slot on an overlying organizer tray to lock the adjacent trays together in the raised position to facilitate access to the underlying organizer tray.

38. The fiber optic organizer according to claim 37 wherein said angled slot is configured to assist in retaining the organizer trays in a locked position beyond the predetermined angle.

39. The fiber optic organizer according to claim 38 means pivotally mounting the organizer trays offset to each other.

40. The fiber optic organizer according to claim 37 wherein each angled tab includes an end having a protrusion for engaging the organizer tray when the angled tab is received within the angled slot.

41. The fiber optic organizer according to claim 37 wherein the distal ends of said organizer trays are offset so that as an organizer tray is raised to the predetermined angle, the angled tab in an underlying organizer tray is received within the angled slot on the overlying organizer tray.

42. The fiber optic organizer according to claim 37 wherein said mounting bracket is angled so that the organizer trays are offset to each other.

43. A method of accessing an organizer tray in a fiber optic organizer including a stack of organizer trays pivotally connected at their proximal ends to a mounting bracket, comprising the steps of:

raising at least two adjacent organizer trays together in a raised position to facilitate access to an underlying organizer tray; and locking the raised organizer trays together by engaging locking mechanisms positioned on the distal ends of the trays; and disengaging the organizer trays by raising the organizer trays beyond a predetermined angle.

44. A method according to claim 43 including the step of maintaining the organizer trays separated from each other in the raised and disengaged position and lowering the organizer trays into the stacked position.

45. A method according to claim 43 including the step of engaging an upstanding tab on one raised organizer tray with the slot on an overlying tray to lock the trays together.

46. A method according to claim 43 including the steps of engaging the tab of an overlying tray and an overlying organizer tray to assist in pushing the overlying organizer tray into a raised position.

* * * * *